United States Patent [19]

Lukes

[11] Patent Number: 5,237,785
[45] Date of Patent: Aug. 24, 1993

[54] STRUCTURAL MEMBER WITH STABLING GROOVE

[76] Inventor: Stephen P. Lukos, 1879 Litchfield Rd., Watertown, Conn. 06795

[21] Appl. No.: 870,899

[22] Filed: Apr. 20, 1992

Related U.S. Application Data

[63] Continuation-in-part of Ser. No. 759,676, Sep. 13, 1991, abandoned.

[51] Int. Cl.$^5$ .............................................. E04H 15/32
[52] U.S. Cl. .......................................... 52/86; 52/202; 52/63; 160/392; 160/398; 160/391
[58] Field of Search ...................... 52/63, 86, 200, 202, 52/222; 160/392, 395, 398, 391

[56] References Cited

U.S. PATENT DOCUMENTS

| | | | |
|---|---|---|---|
| 3,885,335 | 5/1975 | Egermayer | 160/397 |
| 4,132,390 | 1/1979 | Pfarr, Jr. | 160/392 |
| 4,926,605 | 5/1990 | Milliken et al. | 52/63 |

FOREIGN PATENT DOCUMENTS 261023  3/1965  Australia ............................ 160/391

OTHER PUBLICATIONS

Milliken Industries Flier. Date unknown, but predates the present invention.
Bat filer titled Technical Manual for Awnings and Canopies. Date unknown, but predates present invention.
Bat filer titled The Awing Co., by Bat U.S.A., Ontario, Calif. Date unknown, but predates the present invention.
Sunair System flier titled Sonair Profile, by Sunair System Awnings Unlimited, Inc., Anapolis, Md. Date unknown, but predates present invention.
American Sun Control Flies For Fabri-Frame.

*Primary Examiner*—Carl D. Friedman
*Assistant Examiner*—Wynn E. Wood
*Attorney, Agent, or Firm*—John H. Crozier

[57] ABSTRACT

A structural member useful for awning structures, including: an elongated bottom wall; two elongated side walls orthogonally joined to the bottom wall; two inwardly facing, elongated top wall segments orthogonally joined to the side walls to define a stapling groove between the opposing distal edges of the top wall segments, such that a portion of a sheet of fabric may be inserted into the groove; a stapling platform disposed internally of the structural member, parallel to the bottom wall, and orthogonally attached to and extending between the side walls, such that the fabric may be stapled to the stapling platform; a first, elongated hollow channel disposed internally of structural member, defined between the stapling platform, the first and second side walls, and the bottom wall; first and second reinforcing walls disposed between and attached to the first and second top wall segments, respectively, and the stapling platform; second and third elongated hollow channels disposed internally of the structural member, defined between the reinforcing walls and portions of the stapling platform, the side walls, and the top wall segments.

8 Claims, 3 Drawing Sheets

STRUCTURAL MEMBER WITH STABLING GROOVE

CROSS-REFERENCE TO RELATED APPLICATION

This application is a continuation-in-part or my co-pending U.S. patent application Ser. No. 07/759,676, filed Sep. 13, 1991, which is now abandoned. A continuation-in-part was filed Jun. 11, 1992 as application Ser. No. 07/897,568 on this abandoned application.

BACKGROUND OF THE INVENTION

1. Field of the Invention

The present invention relates to awning assemblies generally and, more particularly, but not by way of limitation, to a novel structural member for such assemblies, the structural member having a stapling groove disposed therein and being bendable in any direction without collapsing the stapling groove.

2. Background Art

For many years, awning assemblies have been employed in which the awning fabric is attached to a frame member by the insertion of the fabric in a longitudinally extending, generally U-shaped groove disposed in one side of the frame member. The fabric is then stapled to the bottom of the groove, following which a resilient trim member is inserted into the groove to assist in retaining the fabric therein and to prevent the ingress of water.

A substantial limitation of known such frame members is that the stapling groove tends to collapse when the frame members are bent.

Accordingly, it is a principal object of the present invention to provide a structural member having therein a stapling groove, which structural member can be bent in any desired direction without collapsing the stapling groove.

It is a further object of the invention to provide such structural member that is relatively rigid.

It is an additional object of the invention to provide such structural member that is easily and economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a structural member useful for awning structures, comprising: an elongated bottom wall; first and second elongated side walls orthogonally joined to said bottom wall; first and second inwardly facing, elongated top wall segments orthogonally joined, respectively, to said first and second side walls, so as to define a stapling groove between the opposing distal edges of said top wall segments, such that a portion of a sheet of fabric may be inserted into said groove; a stapling platform disposed internally of said structural member, parallel to said bottom wall, and orthogonally attached to and extending between said first and second side walls, such that said fabric may be stapled to said stapling platform, said stapling platform to substantially prevent collapsing of said groove when said structural member is bent about said first or second side walls; a first, elongated hollow channel disposed internally of structural member, defined between said stapling platform, said first and second side walls, and said bottom wall; first and second reinforcing walls disposed between and attached to said first and second top wall segments, respectively, and said stapling platform; a second elongated hollow channel disposed internally of said structural member, defined between said first reinforcing wall and portions of said stapling platform, said first side wall, and said first top wall; and a third elongated hollow channel disposed internally of said structural member, defined between said second reinforcing wall and portions of said stapling platform, said second side wall, and said top wall segment.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
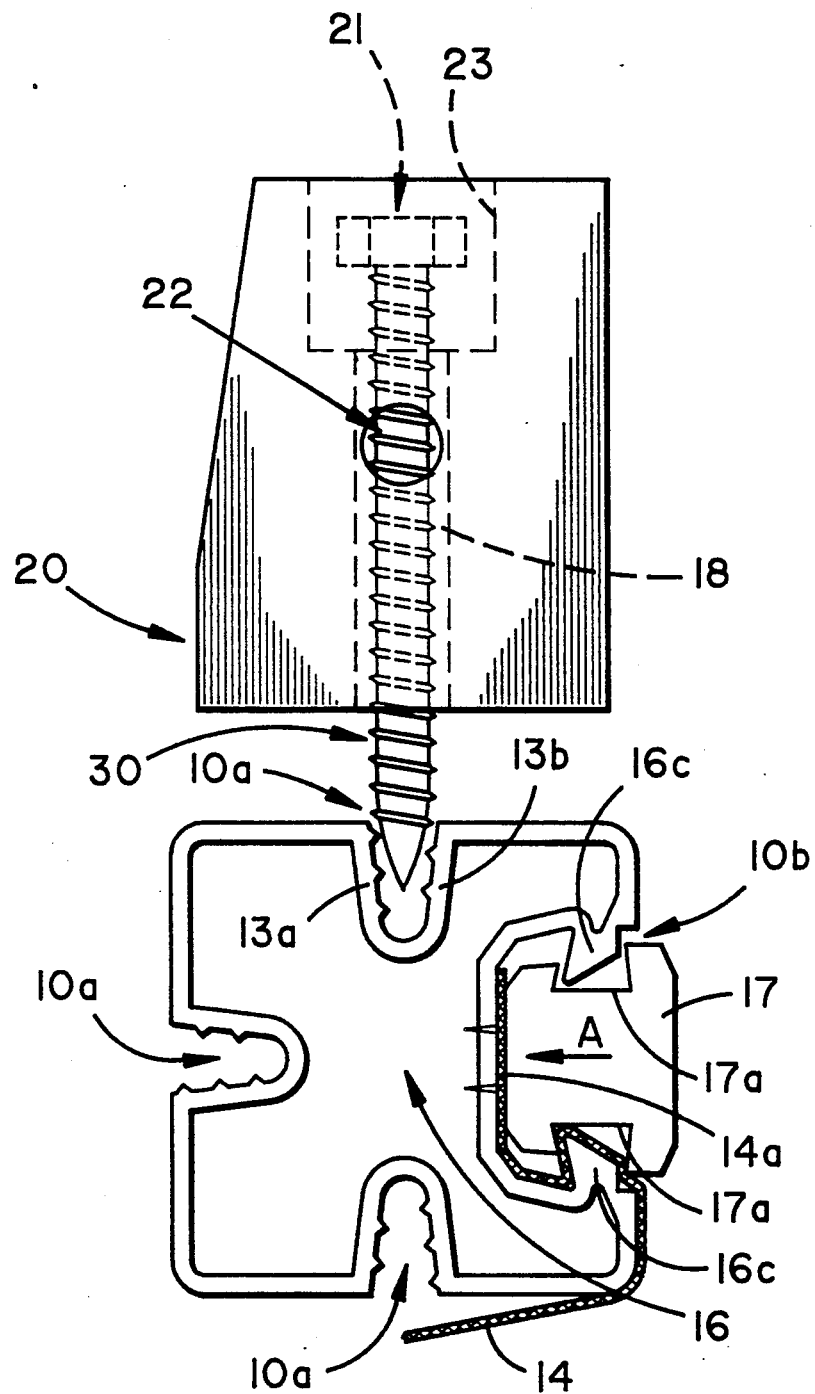
FIG. 1 is a schematic side elevational view of a cleat member and a rail member according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 (FIG. 3 of the above-referenced application) illustrates a rail, or structural member, 16 formed from square tubing with identical keyways 10a on three sides, and a stapling groove 10b on the fourth side. Rail 16 is shown as being attached to cleat member 20 by means of a tapping screw 30 which passes through a bore 18 defined in the cleat member and which can be threadingly advanced into keyway 10a. Rail 16 can also be formed with keyways distributed around tubing of round or other polygonal profile for different angles between cleat positions and the keyways 10b or the rail can also be formed with a single keyway.

Rail 16 is shown as having the end of a piece of fabric 14 disposed therein, stapled to the bottom of groove 10b by means of a plurality of staples, such as staple 14a, inserted through the fabric into the bottom of groove 10b. A resilient sealing strip 17 is then forced into groove 10b in the direction indicated by arrow "A" to help hold the fabric therein and to seal the groove against water penetration which might deteriorate the fastening of the leading end of the fabric. Sealing strip 17 can have longitudinally extending slots or grooves 17a formed therein for snap-fitting with projections 16c formed at the open end of groove 10b. Depending on the application, fabric 14 may extend fully across groove 10b.

Figure 2:
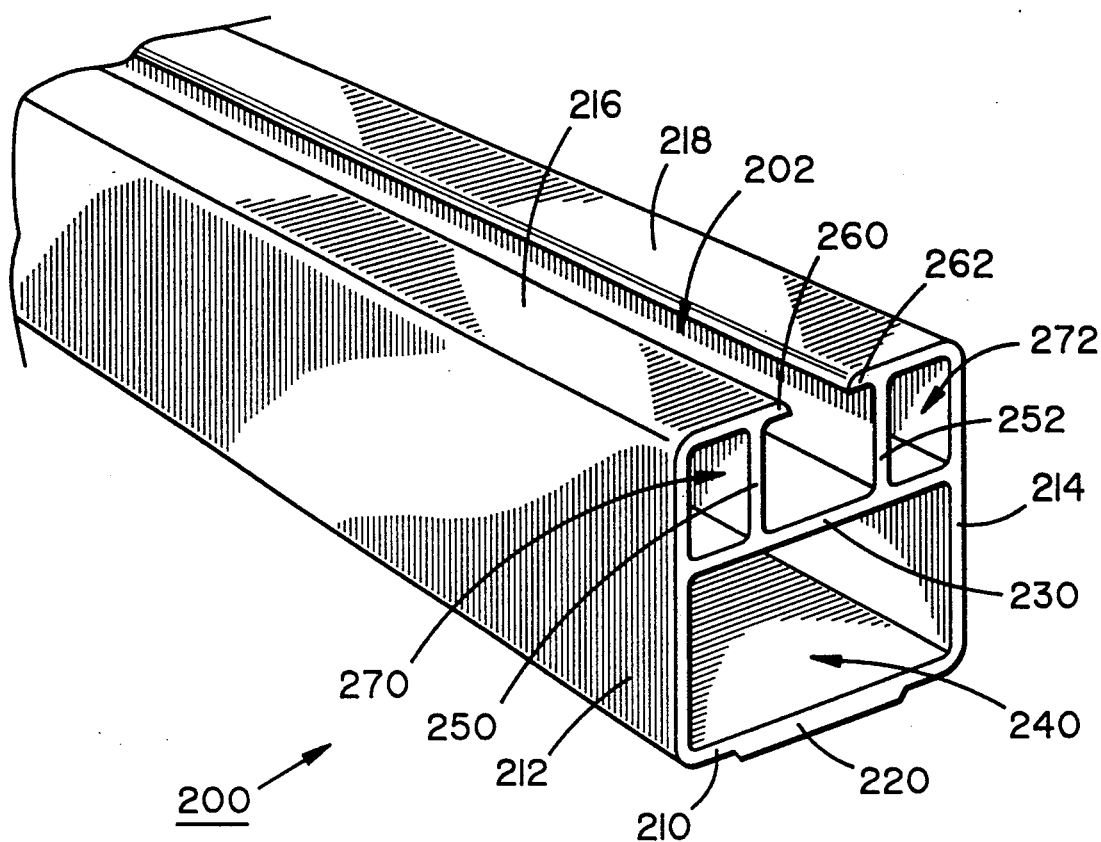
FIG. 2 is a fragmentary, top/side/front perspective view of a structural member according to one embodiment of the present invention.

FIG. 2 illustrates a rail or structural member, generally indicated by the reference numeral 200, with a stapling groove 202 formed therein. Structural member 200 is generally rectangular, and square in this embodiment, with an elongated bottom wall 210, elongated side walls 212 and 214 orthogonally joined to the bottom wall, and inwardly facing, elongated top wall segments 216 and 218 orthogonally joined, respectively, to side walls 212 and 214. The top of stapling groove 202 is defined between the opposing distal edges of top wall segments 216 and 218. Bottom wall 210 includes a thickened portion 220 extending partially thereacross to provide increase structural rigidity to the bottom wall.

Disposed internally of structural member 200 is a stapling platform 230, parallel to bottom wall 210, and extending between side walls 212 and 214 to which the stapling platform is attached. A first, rectilinear hollow channel 240 is thus defined internally of structural member 210 between stapling platform 230, side walls 212 and 214, and bottom wall 210.

Orthogonally disposed between and attached to top wall segments 212 and 214, respectively, and stapling platform 230 are parallel reinforcing walls 250 and 252. It will be noted that reinforcing walls 250 and 252 are set back from the distal ends of top wall segments 212 and 214 so as to form, respectively, elongated projections 260 and 262 along the distal edges of the top wall segments. With reference to FIG. 1, it will be understood that a fabric (not shown on FIG. 2) may be inserted into groove 202 and stapled to stapling platform 230. Then, a sealing strip (not shown on FIG. 2) may be snapped into place in groove 202 by engagement with projections 260 and 262.

Reinforcing wall 250 together with portions of stapling platform 230, side wall 212, and top wall segment 216 define a second, rectilinear hollow channel 270 internally of structural member 200. Likewise, reinforcing wall 252 together with portions of stapling platform 230, side wall 214, and top wall segment 218 define a third, rectilinear hollow channel 272 internally of structural member 200.

It has been found that providing first, second, and third hollow channels in structural member 200 permits bending of the structural member about any of walls 210, 212, 214, and 216 and 218 without collapsing groove 202. It has been found that the provision of stapling platform between side walls 212 and 214 is especially beneficial in preventing collapsing of groove 202 when structural member 200 is bent about either of the side walls.

Structural member 200 may also have disposed therein one or more keyways, such as keyways 10a on FIG. 1.

While the straight, parallel reinforcing walls 250 and 252 of structural member 200 provide for rigidity, it has been found that it is desirable, in some circumstances, particularly when the structural member is bent such that groove 202 is disposed on the outside radius of the bend, for the reinforcing walls to have a certain degree of flexibility. Exemplary reinforcing wall structures to provide such certain degree of flexibility are shown on FIGS. 3-5.

Figure 3:
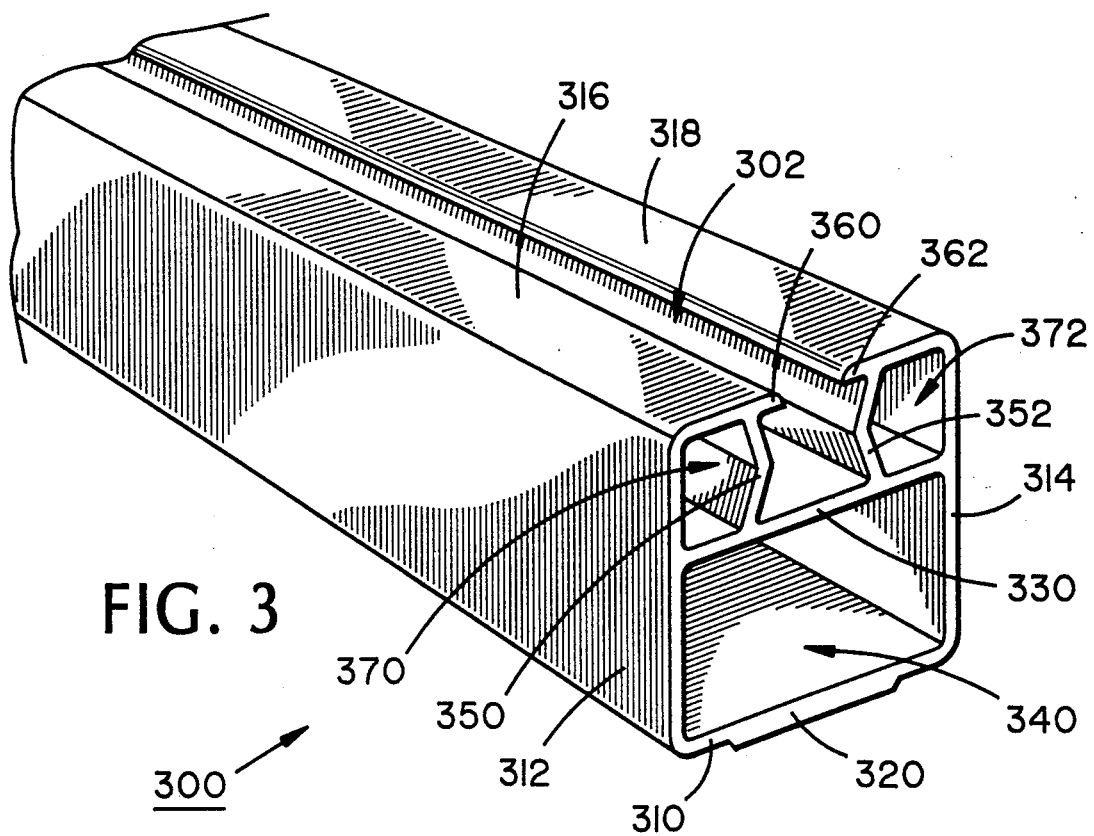
FIG. 3 is a fragmentary, top/side/front perspective view of another embodiment of the present invention.

On FIG. 3, structural member 300 includes reinforcing walls 350 and 352 which are angular to form opposite inwardly facing doglegs. Thus, when structural member 300 is being bent such that groove 302 will be disposed on the outside radius thereof, reinforcing walls 350 and 352 will deform sightly in a controlled manner. Without such controlled deformation, groove 302 is subject to being substantially deformed in the bending process.

Figure 4:
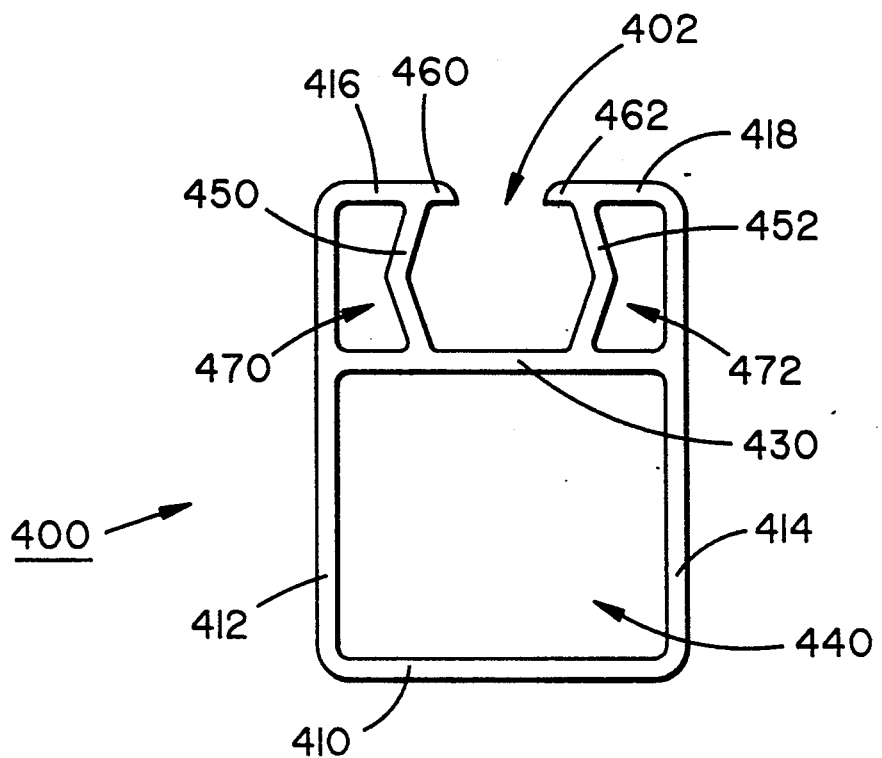
FIG. 4 is an end elevational view of a further embodiment of the present invention.

FIG. 4 illustrates structural member 400 having angularly formed reinforcing walls 450 and 452 which are similar to reinforcing walls 350 and 352 on FIG. 3, except that reinforcing walls 450 and 452 form opposite outwardly facing doglegs.

Figure 5:
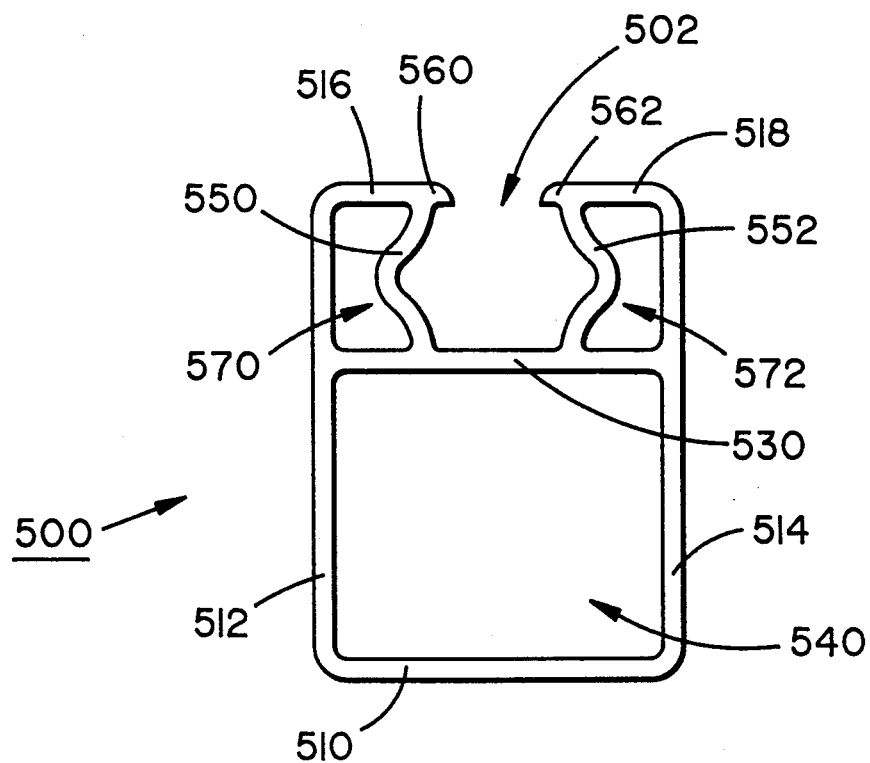
FIG. 5 is an end elevational view of yet another object of the present invention.

The reinforcing walls of any such structural member do not necessarily have to have planar segments and on FIG. 5, there is illustrated structural member 500 having curvilinear reinforcing walls 550 and 552. Reinforcing walls 550 and and 552 are shown as having opposite outwardly facing bulges, but they could have opposite inwardly facing bulges, or they could be of any other desired curvilinear configuration.

Structural members 200, 300, 400, and 500 may be economically formed by conventional extrusion processes and are preferably formed from a suitable conventional aluminum alloy.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A structural member useful for awning structures, comprising:
    (a) an elongated bottom wall;
    (b) first and second elongated side walls orthogonally joined to said bottom wall;
    (c) first and second inwardly facing, elongated top wall segments orthogonally joined, respectively, to said first and second side walls, so as to define a stapling groove between the opposing distal edges of said top wall segments, such that a portion of a sheet of fabric may be inserted into said groove;
    (d) a stapling platform disposed internally of said structural member, parallel to said bottom wall, and orthogonally attached to and extending between said first and second side walls, such that said fabric may be stapled to said stapling platform said stapling platform to substantially prevent collapsing of said groove when said structural member is bent about said first or second side walls;
    (e) a first, elongated hollow channel disposed internally of structural member, defined between said stapling platform, said first and second side walls, and said bottom wall;
    (f) first and second reinforcing walls disposed between and attached to said first and second top wall segments, respectively, and said stapling platform;
    (g) a second elongated hollow channel disposed internally of said structural member, defined between said first reinforcing wall and portions of said stapling platform, said first side wall, and said first top wall segment; and (h) a third elongated hollow channel disposed internally of said structural member, defined between said second reinforcing wall and portions of said stapling platform, said second side wall, and said second top wall segment.

2. A structural member, as defined in claim 1, further comprising: said bottom wall including an integral thickened portion extending at least partially thereacross to provide increased structural rigidity to said bottom wall.

3. A structural member, as defined in claim 1, further comprising: providing said reinforcing walls set back from said distal ends of said first and second top wall segments so as to form, respectively, first and second elongated projections along the distal edges of said first and second top wall segments, such as to hold a sealing strip in said groove.

4. A structural member, as defined in claim 1, wherein said structural member comprises a square shape.

5. A structural member, as defined in claim 1, wherein said structural member comprises a rectangular shape.

6. A structural member, as defined in claim 1, wherein said first and second reinforcing walls are planar and parallel to each other.

7. A structural member, as defined in claim 1, wherein said first and second reinforcing walls are angularly shaped doglegs, so that said first and second reinforcing walls can deform in a controlled manner to prevent substantial deformation of said groove when said structural member is bent with said groove on the outside radius of the bend.

8. A structural member, as defined in claim 1, wherein said first and second reinforcing walls are curvilinear, so that said first and second reinforcing walls can deform in a controlled manner to prevent substantial deformation of said groove when said structural member is bent with said groove on the outside radius of the bend.

* * * * *

UNITED STATES PATENT AND TRADEMARK OFFICE
CERTIFICATE OF CORRECTION

PATENT NO. : 5,237,785

DATED : August 24, 1993

INVENTOR(S) : Stephen P. Lukos

It is certified that error appears in the above-identified patent and that said Letters Patent is hereby corrected as shown below:

On the title page, item [19]: "Lukes" should read --Lukos--

On the title page, in the Title, "STABLING" should read --STAPLING--.

On the title page, item [56], under Other Publications, of References Cited, in reference to the "Milliken Industries Flier", the words "but predates the present invention" should be deleted.

Signed and Sealed this

Twenty-fourth Day of January, 1995

*Attest:*

BRUCE LEHMAN

*Attesting Officer*  *Commissioner of Patents and Trademarks*